Nov. 3, 1925.
J. D. FILLEUL
1,560,225
TREAD MEMBER
Filed Feb. 26, 1924
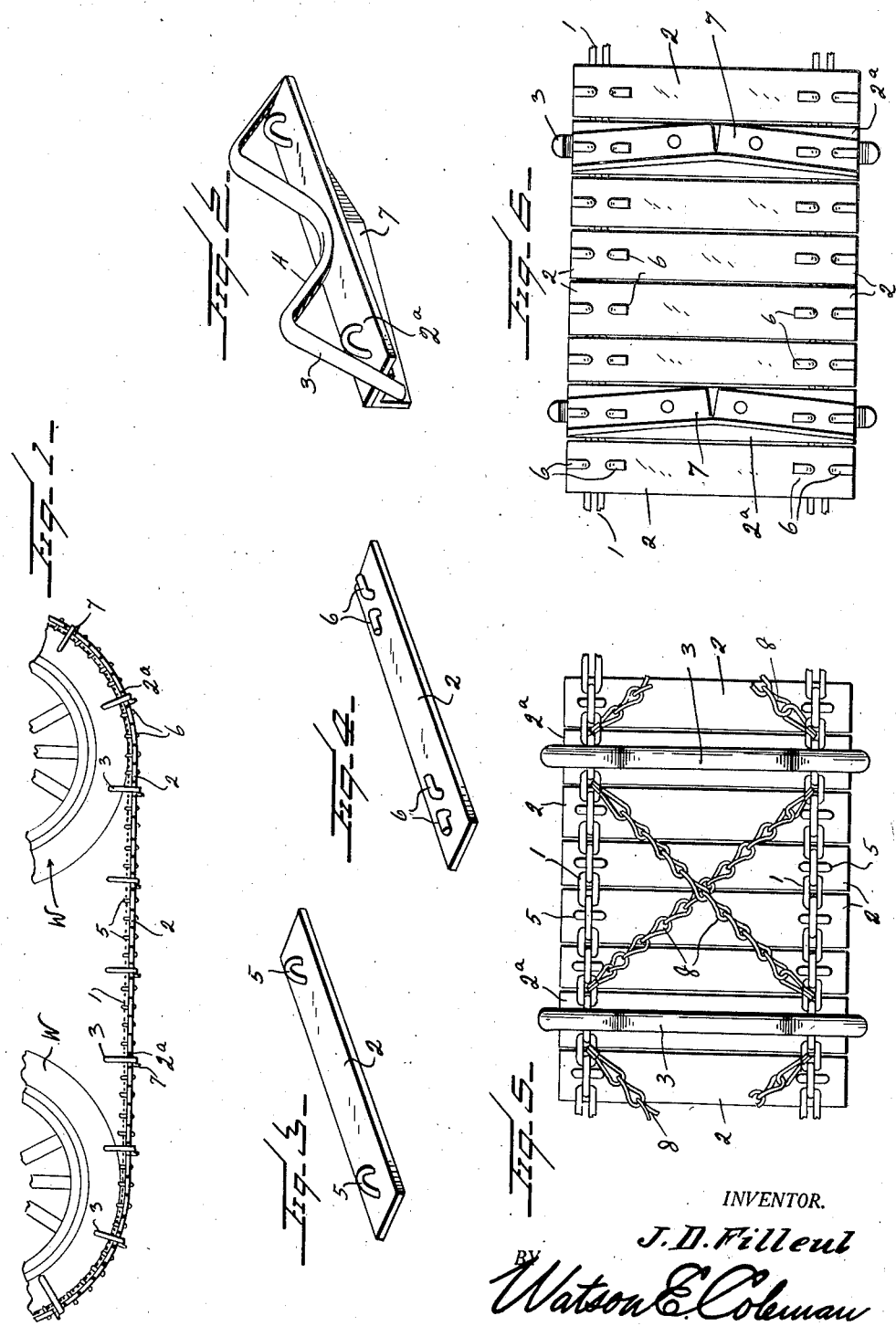
INVENTOR.
J. D. Filleul
BY Watson E. Coleman
ATTORNEY.

Patented Nov. 3, 1925.

1,560,225

UNITED STATES PATENT OFFICE.

JAMES DOUGLASS FILLEUL, OF MANCHESTER, NEW HAMPSHIRE.

TREAD MEMBER.

Application filed February 26, 1924. Serial No. 695,353.

*To all whom it may concern:*

Be it known that I, JAMES DOUGLASS FILLEUL, a citizen of the United States, residing at Manchester, in the county of Hillsborough and State of New Hampshire, have invented certain new and useful Improvements in Tread Members, of which the following is a specification, reference being had to the accompanying drawings.

This invention relates to certain improvements in tread members and has relation more particularly to a member of this general character of an endless type and it is an object of the invention to provide a tread member with novel and improved means whereby it may be effectively engaged with its supporting and operating means and wherein means are provided to prevent clogging, caking or the like of said member.

It is also an object of the invention to provide a device of this general character provided with suitable guides whereby the same is maintained in proper working relation with its supporting and operating means.

The invention consists in the details of construction and in the combination and arrangement of the several parts of my improved tread member whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in elevation illustrating a tread member constructed in accordance with an embodiment of my invention;

Figure 2 is a view in perspective of one of the guides as herein comprised;

Figure 3 is a view in perspective of one of the cross strips comprised in the tread member;

Figure 4 is a view in perspective of the tread member as illustrated in Figure 3 inverted;

Figure 5 is an enlarged fragmentary view in inner plan of the tread member as illustrated in Figure 1;

Figure 6 is an enlarged fragmentary view in outer plan of the tread member as illustrated in Figure 1.

My improved tread member as herein disclosed, comprises two side members 1 preferably chains which have disposed transversely thereof and bridging the space therebetween the metallic strips or slats 2 and $2^a$ each of said slats when applied, being positioned in close proximity to the adjacent strips or slats. The slats $2^a$ are spaced at regular intervals along the tread member and each of said slats $2^a$ has disposed lengthwise thereon a guide 3 the central portion of which being disposed, as at 4, on a predetermined inbow and of such configuration and dimensions as to readily engage the tire of a wheel W with which the tread is employed. The guide 3 has its end and intermediate portions welded or otherwise suitably attached to the slat $2^a$.

The tread, as herein disclosed, is particularly adapted for use in connection with a traction device of a character described and claimed in an application for patent Serial No. 695,352, filed February 26, 1924. Each of the members or slats 2 and $2^a$ has its opposite end portions connected with the links of the side members or chains 1 by the staples 5. Each of said staples has its free end portions extending beyond the outer faces of the slat or strip 2 or $2^a$ with such extremities angularly disposed, as at 6, to maintain the strip or slat in applied position. These angular portions 6 serve to provide traction lugs or calks to assure effective contact of the tread member with the surface over which the same is traversing and more particularly ice or kindred slippery surfaces.

This particular mounting of each of the slats or strips 2 and $2^a$ permits the same to have limited rocking movement or vibration when the vehicle to which it is applied is in transit, such movement or vibration serving effectually to prevent the tread member from becoming clogged or caked with snow, ice, mud or the like whereby the efficiency of the tread is materially increased.

The strips or slats $2^a$ are also each provided with a further traction element 7 herein disclosed as an angle iron extending lengthwise of the strip or slat $2^a$ and substantially V-shaped in form. This is of particular advantage as the stretch of the tread in contact with the surface is effectually maintained against slippage.

It is also to be noted that the extremities of each of the guides 3 overlie and extend beyond the ends of the associated strip or slat 2ª whereby additional traction elements are provided.

Between each pair of adjacent strips or slats 2ª is arranged a pair of crossed chains 8, the extremities of which being connected to the links of the side members or chains 1 immediately adjacent to the strips or slats 2ª. These crossed chains 8 operate effectually to maintain the tread in requisite alignment.

From the foregoing description it is thought to be obvious that a tread member constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A tread of the class described comprising a pair of flexible side members, transversely disposed slats associated with said side member and bridging the space therebetween, means for connecting the end portions of the slats to the side members, said connection permitting the slats to have rocking movement, guides secured to certain of said slats, and crossed flexible members secured to the side members between adjacent guides, said crossed members being secured to the side members at points in relatively close proximity to the guides.

In testimony whereof I hereunto affix my signature.

JAMES DOUGLASS FILLEUL.